F. J. SEMRADEK.
HAND PROPELLED VEHICLE.
APPLICATION FILED JAN. 25, 1913.
1,203,142.
Patented Oct. 31, 1916.
2 SHEETS—SHEET 1.
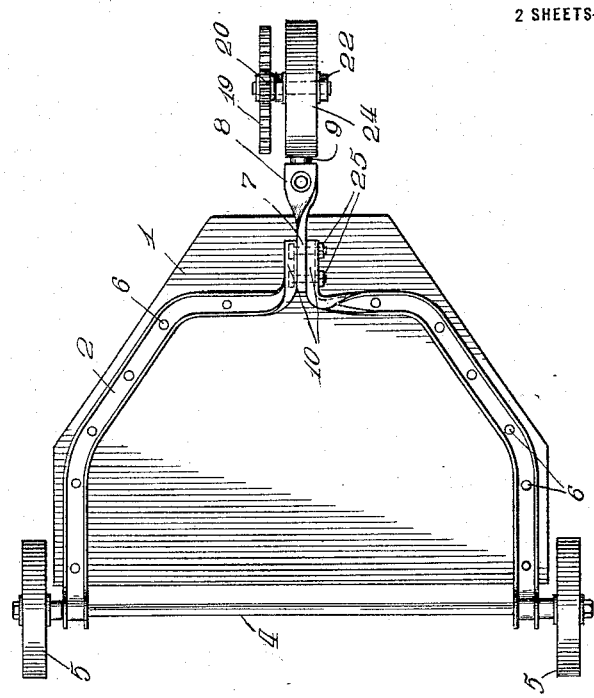
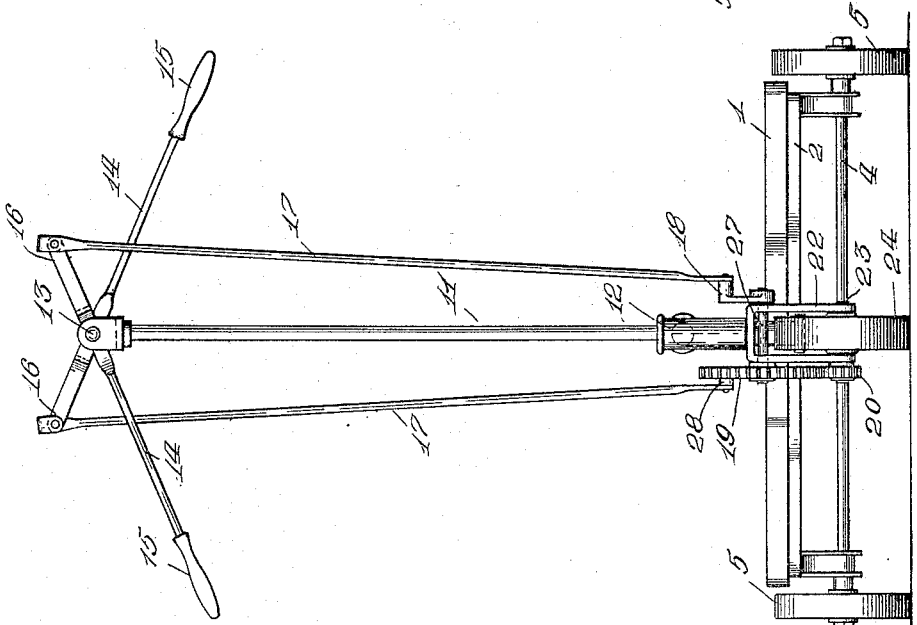
Witnesses:
Inventor
Frank James Semradek
by Lotz + Scheible
Attys.

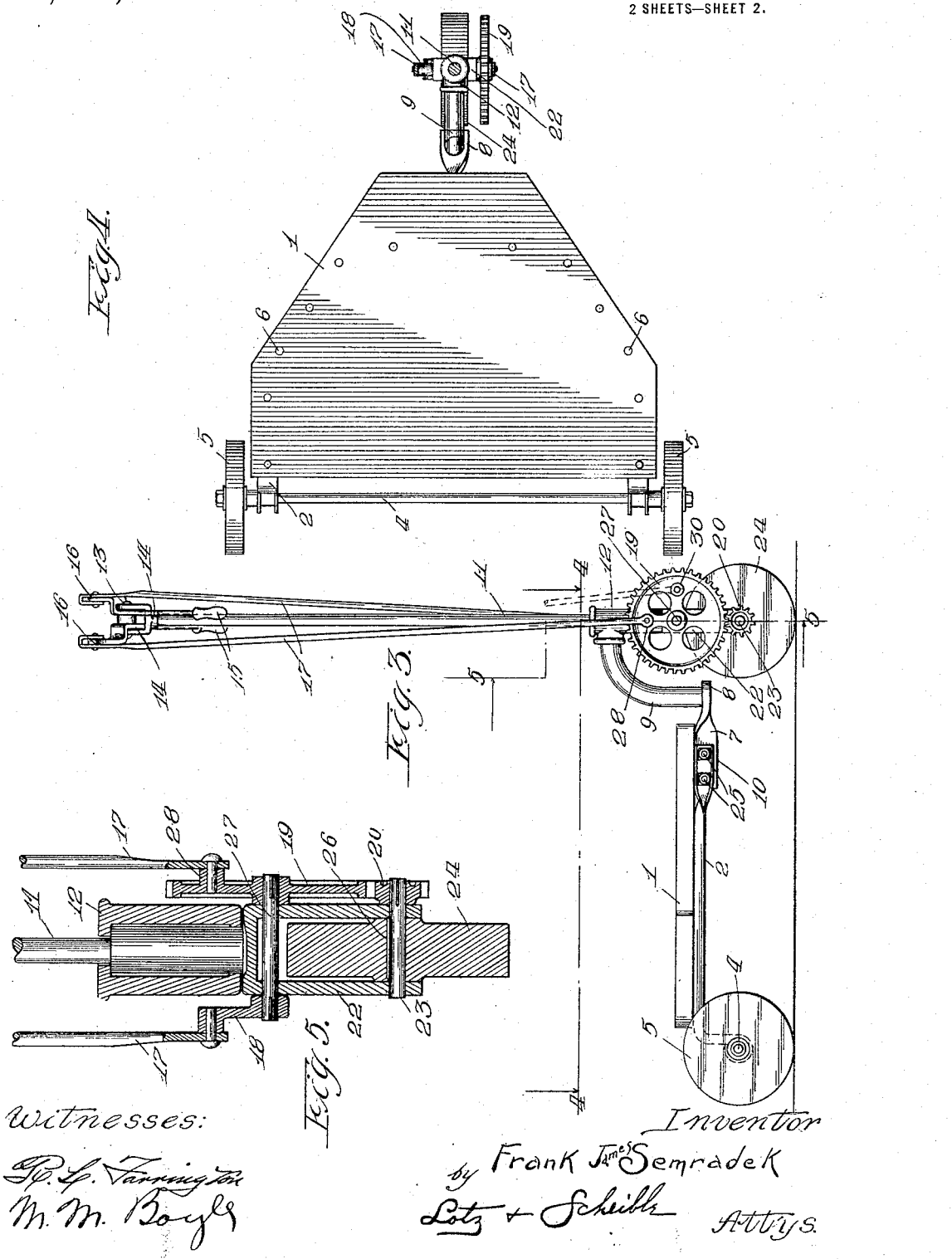

UNITED STATES PATENT OFFICE.

FRANK JAMES SEMRADEK, OF CHICAGO, ILLINOIS.

HAND-PROPELLED VEHICLE.

1,203,142.  Specification of Letters Patent. Patented Oct. 31, 1916.

Application filed January 25, 1913. Serial No. 744,201.

*To all whom it may concern:*

Be it known that I, FRANK JAMES SEMRADEK, citizen of the United States, residing at Chicago, in the county of Cook and State of Illinois, have invented certain new and useful Improvements in Hand - Propelled Vehicles; and I do hereby declare the following to be a full, clear, and exact description of the invention, such as will enable others skilled in the art to which it appertains to make and use the same.

My invention relates to passenger vehicles and more particularly to the class of toy vehicles used by boys and commonly known as "pushmobiles".

It has heretofore been customary for the person standing upon the platform of such a vehicle to propel the same by occasionally reaching down to the ground with one foot.

One object of my invention is to provide means whereby the passenger of such a vehicle may propel the same with his arms.

Another object is to provide means for varying the times at which the two handles of the propelling mechanism of my device are moved up and down, so that these handles may be raised and depressed either simultaneously or at some predetermined interval of time.

Further objects are to provide a simple and strong truck construction for vehicles of this class, and one permitting of a partial dismounting of the truck parts to facilitate packing and shipping.

In the drawings: Figure —1— shows a front elevation of the vehicle of my invention. Fig. —2— shows an upward plan view of the same. Fig. —3— shows a side view of the same. Fig. —4— shows a plan view of the vehicle taken along the line 4—4 of Fig. —3—, with the connecting rods of the operating mechanism omitted. Fig. —5— shows a section through Fig. —3— along the line 5—5.

In the embodiment of my invention shown in the drawings, the vehicle has a platform 1, preferably of wood, supported by a pair of steel members 2 which together form a substantially U-shaped truck frame, the greater part of which frame is positioned horizontally under the wooden platform 1 and secured to the latter by bolts 6. The rear end of each of the members 2 is preferably bent downward and then coiled upon itself so as to form a bearing for the main axle 4 of the vehicle, which axle has rear wheels 5 mounted upon its opposite ends. The forward ends 10 of the members 2 comprising the U-shaped portion of the truck frame are preferably bent into parallel planes, thereby permitting the end 7 of another steel member to be interposed between these ends 10 and secured to the same by bolts 25. The frame member 7 projects beyond the forward edge of the platform 1 and has secured to it an arm 9 terminating in a tubular elbow 12, which forms a bearing for the steering fork 22 of the vehicle. Pivoted in this steering fork 22 is a secondary axle 23 having a steering wheel 24 nonrotatably secured to the same by a key 26 and also having a pinion 20 keyed to an extension of the said axle outwardly of the fork 22. The latter also carries a gear axle 27 having a crank 18 and a gear 19 keyed respectively to its opposite ends.

The steering fork 22 is rigidly connected to a riser or steering post 11 having at its upper end a pivot 13 passing through a pair of oppositely disposed levers of the first class 14, each of which levers has at one end a handle 15. The other ends 16 of the levers 14 are connected by connecting rods, respectively, with the crank 18 and a corresponding crank formation 28 upon the gear 19, the points of connection between the rods 17 and the crank formations to which they are thus connected being equidistant from the gear shaft 27. When the levers and the crank formations are thus connected, an oscillation of the levers about their common pivot 13 will cause the connecting rods 17 to move in a substantially longitudinal direction, thereby rotating the gear 19 and the pinion 20 with which the said gear is intermeshed. Since this pinion is secured to the secondary shaft 23 upon which the steering wheel 26 is nonrotatably mounted, the rotation of this pinion will also rotate the forward wheel of the vehicle, thereby propelling the latter.

When the levers and their connections are relatively positioned as in Fig. —1—, it will be evident from the drawing that handles 15 will move up and down simultaneously. However, I do not wish to be restricted to this arrangement of the propelling mechanism as it may be desirable to vary the connections so as to avoid a so-called "dead center" upon the driving gear. I, therefore, provide another raised boss 30 on the outer surface of the wheel 19, preferably located at a pivot 90 degrees from the position of the pin 28 so that one of the rods 17 may be connected to this formation 30, thereby arranging the mechanism to destroy the dead center.

Having thus shown and described my invention in an embodiment capable of numerous modifications without departing from its spirit, I claim—

In a hand propelled vehicle a relatively low platform adapted to serve as a support upon which the operator may stand, a steering post mounted in a vertical bearing for steering movement, a steering wheel mounted upon the lower end of the post, transversely disposed operating and steering levers pivotally mounted on the upper end of the post, and mechanism operatively connecting the levers with the steering wheel whereby when the levers are moved up and down upon their pivot the vehicle is propelled.

In testimony whereof I have signed my name in presence of two subscribing witnesses.

FRANK JAMES SEMRADEK.

Witnesses:
M. M. BOYLE,
ALBERT SCHEIBLE.

Copies of this patent may be obtained for five cents each, by addressing the "Commissioner of Patents, Washington, D. C."